Patented Mar. 24, 1936

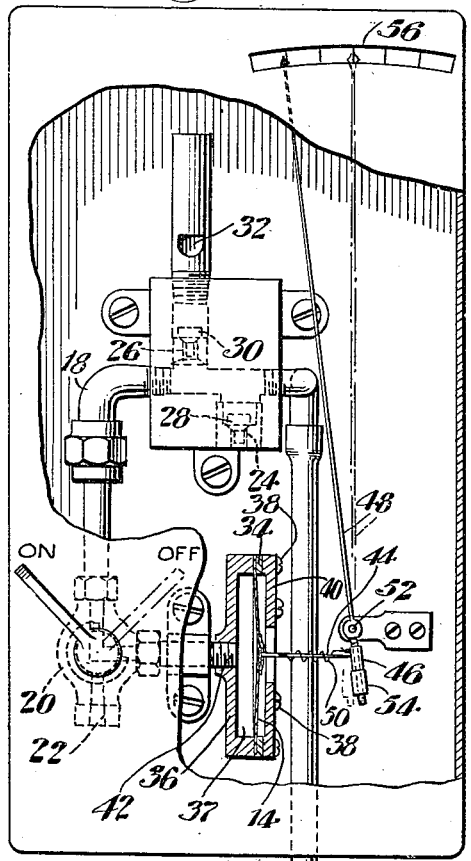

2,035,025

UNITED STATES PATENT OFFICE 2,035,025

PRESSURE GAUGE

Daniel K. Segur, West New Brighton, N. Y., assignor to Doherty Research Company, New York, N. Y., a corporation of Delaware Application March 30, 1933, Serial No. 663,445

2 Claims. (Cl. 73—110)

This invention relates to diaphragm pressure gauges, and more particularly to a sensitive gas pressure actuated instrument for locating the top dead center position of the piston of an automotive engine cylinder.

As is well known, the power development efficiency of automotive engines is strictly dependent on the accuracy of valve and ignition timing in relation to piston position. In other words an automotive engine develops maximum operating efficiency under any particular condition of service only when the inlet and exhaust valves and ignition element of each engine cylinder are accurately timed and synchronized with respect to the top dead center position of the piston. In checking the valve and ignition timing of an automotive engine cylinder it is desirable to first locate the top dead center position of the piston at the end of the compression stroke within an allowable tolerance of a thousandth of an inch. Moreover it is desirable to carry out the valve and ignition timing operation rapidly and without removing the cylinder head or otherwise seriously disrupting the normal operating condition of the engine.

Instruments heretofore developed and used for locating the top dead center position of an automotive engine are in general relatively complicated in number of accessory parts and hence costly; and in application such instruments are in general relatively inconvenient, time-consuming and inaccurate, particularly in the hands of an unskilled operator.

Objects of the present invention are to provide a sensitive low pressure diaphragm type gauge which has a simple, rugged and inexpensive construction; to provide an instrument whereby the top dead center position of a piston at end of compression stroke may be quickly and certainly located within a limit of accuracy under .001 inch piston travel; and to provide an instrument adapted for giving quick, accurate and reliable indication of pressure changes of a small fraction of an inch water pressure, even in the hands of an unskilled operator.

Calculations and check tests on the clearance or ignition space of a common type of four cycle engine cylinder between the piston head and spark plug opening, show that each .001 inch of piston travel toward or away from its top dead center compression stroke position respectively results in an increase or drop in pressure of less than ½ inch water pressure, starting from atmospheric pressure. The instrument forming the subject of the present invention in its preferred form is accordingly featured by embodying as an element a diaphragm pressure gauge having a sensitive diaphragm and mounting of construction suitable for giving accurate and reliable indications of pressure changes within a range of less than ½ inch water pressure above and below atmospheric.

With the above and other objects and features in view which will hereinafter appear, the invention consists in the improved diaphragm pressure gauge and dead center finder hereinafter described and more particularly defined in the accompanying claims.

The invention will hereinafter be particularly described by reference to the accompanying drawing, in which:

Fig. 1 is a view in side elevation of a preferred embodiment of the instrument forming the subject of the invention, with parts shown in vertical section;

Fig. 2 is a view in side elevation, with parts in vertical section, of a modified form of the instrument;

Fig. 3 is a view of a side elevation, with parts broken away, showing another structural modification of the instrument; and Fig. 4 is a view in vertical section taken on the line 4—4 of Fig. 3.

In the embodiment of the invention which is illustrated in Fig. 1, the instrument is shown as operatively connected to the combustion chamber of an automotive engine cylinder by means of an adapter fitting 10 which is threaded to fit the spark plug opening in the cylinder head 12. Communicable connection between the cylinder and adapter 10 and diaphragm 14 of the instrument is made through flexible tubing 16 and a manifold 18. This connection is made and broken by a three-way valve 20 having a passage 22 opening to atmosphere. Leading off from manifold 18 intermediate the adapter and valve 20 are two lateral passages 24 and 26 each having an outlet to atmosphere. Passage 24 is normally closed against inflow of air from atmosphere to manifold 18 by a ball valve 28 which may be weighted to hold its seat except when there is a vacuum in manifold 18 exceeding say—1 inch of water pressure. Likewise passage 26 is normally closed against outflow of air or gas from manifold 18 to atmosphere by a ball valve 30 which may be weighted to hold its seat except when the pressure in manifold 18 exceeds say 1 inch water pressure. Valve 28 functions as a vacuum relief valve preventing development of a vacuum in manifold 18 exceeding the amount which the valve is set to relieve, and valve 30 functions as a pressure relief valve preventing development of pressure in manifold 18 exceeding that which the valve is set to relieve. On the atmosphere side of pressure valve 30 there is mounted a whistle 32 which functions as a signal indicating when the piston is on compression stroke.

Experience has shown that a diaphragm 14 constructed of a gas impervious thin sheet of cold vulcanized thrice-dipped latex rubber has sufficient low pressure deflection when held under tension to meet the requirements of this type of sensitive pressure gauge. A circular latex sheet diaphragm of say 1 inch unblanked diameter may be satisfactorily mounted under tension on a peripheral ring 34 of 1/8 inch thick Cellophane or molded resin. Cellophane is a good material for mounting such rubber diaphragm because it is accurately surfaced, sufficiently sectile and non-brittle, chemically neutral to rubber and rubber cement, and has sufficient cohesion for rubber cements to permit their use in attaching the rubber sheet to the ring. In place of rubber a thin gas-impervious sheet of a malleable ductile non-corrosive metal such as gold or German silver may serve for the diaphragm.

The diaphragm with its supporting ring is mounted as a unit on a diaphragm casing 36 by means of screws 38 which also serve to hold a centrally apertured cap 40 in engagement with the walls of casing 36 and with the diaphragm and its supporting ring 34. Manifold 18 connects with chamber 37 of which the diaphragm forms one side, through a threaded nipple 42 in a boss at the base of the chamber. A needle 44 has an upset base flange which is firmly attached, as by a sheet rubber gasket and rubber cement, to the center of diaphragm 14. Needle 44 projects outwardly at right angles to the surface of the diaphragm through the aperture in cap 40; and serves to transmit any movement of the diaphragm to a bearing block 46 which is rigidly mounted on a pivoted pointer 48. A helical spring 50 having one end attached to the needle 44 and its other end attached to block 46, serves to hold the point of the needle in constant contact with the block. Pointer 48 is pivotally mounted on a supporting bearing 52, and is counterpoised by an adjustable weight 54. Linear reciprocable motion of the diaphragm and needle is thus transferred to a rotational swing of the pointer over a scale 56. By suitable dimensioning of the thickness, initial tension and diameter of the diaphragm 14, tensional strength of spring 50, and lever arm length of pointer 48, the gauge can be adjusted to magnify deflections of the diaphragm resulting from a pressure change of say 1/2 inch water pressure in chamber 37 to a pointer travel of say 3/8 inch over scale 56. With zero position of the scale representing atmospheric pressure, the scale can be calibrated to indicate fractions of an inch water pressure above atmospheric on the left side of the zero position, and fractions of an inch water pressure below atmospheric on the right side of the zero position; or in terms of thousandths of an inch piston travel on each side of top dead center.

To locate the top dead center position of an engine piston with the instrument shown in Fig. 1, the adapter 10 is fitted in the spark plug opening of the cylinder, and the crank of the engine is turned until the whistle 32 signals advance of piston 58 on its compression stroke toward top dead center position. During this operation valve 20 is in the off position closing communication between the engine cylinder and diaphragm chamber 37, and opening communication between chamber 37 and atmosphere through valve passage 22. With relief valve 30 set to open on increase of pressure in manifold 18 above 1 inch water pressure, piston 58 on compression stroke will force air through tube 16 into the manifold, thereby building up pressure, opening the relief valve 30, and actuating the whistle. On any stroke of the piston other than compression the relief valve 30 and whistle will not operate (assuming that the valves of the engine are functioning properly); and on suction stroke of the piston, air will flow into the engine cylinder through vacuum relief valve 28 which is set to open at about 1 inch water pressure.

With the piston on the compression stroke and approaching top dead center position, the three way valve 20 is turned to the "on" position whereby the diaphragm 14 is communicably connected with ignition chamber 60 of the engine. Deflection of the diaphragm under the pressure maintained in manifold 18 is transmitted by needle 44 to pointer 48, causing the pointer to swing to the left on scale 56 to a point representing the pressure in manifold 18, where it remains until the piston 58 has reached top dead center position. As soon as the piston passes top dead center the pressure in manifold 18 and diaphragm chamber 37 starts to drop, valve 30 closes, and pointer 48 swings to the right on scale 56. With the parts of the instrument dimensioned as previously described, the operator is enabled to locate top dead center position of the piston within a tolerance of .001 inch piston travel by holding the engine crank stationary before pointer 48 has swung more than 3/8 of an inch to the right on the scale 56 from the point illustrated in Fig. 1 indicating pressure at top dead center.

Tests indicate that the instrument can be readily designed to accurately indicate pressure changes as low as .01 inch water pressure, which may be magnified to a pointer swing of 0.1 inch on the scale 56, representing a displacement of the engine piston from top dead center of at most two or three ten-thousandths of an inch. With a 4 inch diameter diaphragm and a pointer swing magnification of 25, a pressure change of .005 inch water pressure will produce a pointer swing of 0.1 inch on the scale. Without any pointer magnification a 15 inch diameter diaphragm properly mounted will produce a 0.1 inch deflection of the center of the diaphragm with a pressure fluctuation of .01 inch water pressure.

The instrument requires no accessory parts other than adapters to fit various sizes of spark plug openings. The instrument can be attached to the engine cylinder ready for test in the time required to remove the spark plug and insert the adapter; and the top dead center position of the piston can be located even by an unskilled operator within the very short time required to turn the engine over by crank to the top dead center position on the compression stroke. By using a suitable length of tube 16, the instrument can be located for the test in a position where the scale is clearly visible to the operator standing at the engine crank. The accuracy of the reading is not adversely affected by a tube length up to 25 feet.

In employing a "stripper" rubber diaphragm of a few thousandths inch thickness formed by dipping a form in latex several times to insure against pores, it is important that the diaphragm be properly mounted under tension on the supporting ring 34. If not properly mounted under tension, the diaphragm may develop flapping and undue deflection at the very point of interest where the pressure change takes place which it is desired to measure. Care must also be used in mounting needle 44 on the diaphragm without puncturing the diaphragm or blanking any substantial proportion thereof, and to insure against any discernible relative looseness of the joint between needle and diaphragm. Any loose link motion between the needle 44 and the diaphragm and pointer naturally affects adversely the accuracy of the instrument, and is to be avoided as by the use of back lash compensators. Latex sheet rubber is a preferred material for the diaphragm because of its sensitivity, lack of porosity, and freedom from grain in any particular direction.

The modified form of instrument which is shown in Fig. 2 has parts corresponding substantially in design and function to parts of the instrument of Fig. 1 which are correspondingly numbered. In place of the three way valve 20 of the instrument of Fig. 1, there is substituted in Fig. 2 a T-fitting 62 having a direct connection to the tube 16, and also communicably connected by nipples 64 and 66 respectively with two adjustable two-way valves 68 and 70. Manifold 19 connects fitting 62 through valve 70 with two diaphragm chambers 72 and 74, and through valve 68 with diaphragm chamber 37. Diaphragms 76 and 78 are mounted respectively in chambers 72 and 74, and a pipe fitting 80 communicably connects chamber 74 with atmosphere, while chamber 72 is ported out to atmosphere through an aperature 81. Each of diaphragms 76 and 78 has mounted rigidly thereon and extending axially thereof respective valve stems 82 and 84. Valve stem 82 has a valve head 86 controlling admission of air or gas from manifold 19 to diaphragm chamber 72, and valve stem 84 is fitted with a valve head 88 controlling inflow of air from atmosphere to chamber 74. Pressure of gas in manifold 19 lifts valve 86 off its seat and deflects diaphragm 76 upwardly, and deflection of diaphragm 78 upwardly by vacuum in chamber 74, lifts valve 88 off its seat. Thus diaphragms 76 and 78 and the valves 86 and 88 which are respectively connected thereto, perform the same functions as the corresponding relief valves 30 and 28 of the instrument of Fig. 1. Colored signal discs 90 and 92 mounted on extensions of valve stems 82 and 84 reciprocate with the valves into line with peepholes 87 in the front cover of the instrument, thereby signaling to the operator when the engine piston is on a compression or suction stroke. A back lash compensator spring 51 attached at one end to the instrument frame and at the other end to the pointer, serves to maintain contact between needle 44 and bearing 46 and diaphragm 14.

The modification of the low pressure gauge which is shown in Figs. 3 and 4 may be used in the dead center finders of Figs. 1 and 2 with suitable accessories in the form of pressure and vacuum relief valves and compression stroke signal. The diaphragm 15 of this gauge may be constructed of a thin sheet of malleable ductile metal such as gold. Pressure air enters the diaphragm chamber below the diaphragm, causing upward deflection thereof. An integral projection or extension 43 on the upper surface of the diaphragm serves to transmit movement thereof to an arm 94 of a bell crank member 96. The resulting rotation of the crank is transmitted by another arm 98 of the crank member to spoke 100 of a segmental toothed wheel 102. The teeth of wheel 102 mesh with a toothed pinion 104 which is journaled on a pin 106 on which pointer 49 is hinged. Motion imparted to pointer 49 by upward deflection of diaphragm 15 is opposed by a spiral spring 108 with a force sufficient to compensate for back lash of transmission linkage.

The sensitive low pressure indicating gauge element of this automotive timing device very apparently has utility in other applications, as for example in automatic operating controls and depth and flow measuring devices governed by small variations of pressure or of pressure differential. Thus, for example, in furnace heat treating operations a sensitive low pressure indicating gauge of the character described would have utility in maintaining constant pressure conditions and also, in combination with automatic combustion control equipment, for maintaining furnace atmosphere at the neutral point between over and under-ventilation. A dry mechanical pressure gauge of the type described is adaptable both for use as an indicating and as a recording gauge.

The invention having been thus described, what is claimed as new is:

1. A diaphragm pressure gauge adapted to indicate small pressure changes of less than ½ inch water pressure, comprising a casing, a thin gas-impervious diaphragm fixed thereon to form a chamber in the casing, a transmission needle mounted on the outer face of the diaphragm and extending at right angles to the plane of the diaphragm in substantially its central axis, an indicating pointer rotatably mounted and having an adjustable counterweighted extension, a bearing block mounted on the pointer, and a back lash compensator for holding the free end of the transmission needle in continuous contact with the bearing block of said pointer, and for holding the mounted end of said needle in continuous contact with the surface of said diaphragm.

2. A top dead center piston stroke indicator comprising a diaphragm pressure gauge sensitive to pressure changes of less than one-half inch water pressure, an adaptor fitting and tubing for communicably connecting the gauge diaphragm with the working side of a cylinder in which the piston operates, and automatic vacuum and pressure relief valves located in the tubular connection between the cylinder and gauge diaphragm to limit the pressure change to which said diaphragm is subjected.

DANIEL K. SEGUR.